(12) United States Patent
Roeland

(10) Patent No.: US 10,103,896 B2
(45) Date of Patent: Oct. 16, 2018

(54) METHOD AND DEVICE OF A POLICY CONTROL AND CHARGING (PCC) SYSTEM IN A COMMUNICATION NETWORK

(71) Applicant: TELEFONAKTIEBOLAGET LM ERICSSON (PUBL), Stockholm (SE)

(72) Inventor: Dinand Roeland, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 4 days.

(21) Appl. No.: 15/307,599

(22) PCT Filed: Apr. 30, 2014

(86) PCT No.: PCT/SE2014/050534
§ 371 (c)(1),
(2) Date: Oct. 28, 2016

(87) PCT Pub. No.: WO2015/167377
PCT Pub. Date: Nov. 5, 2015

(65) Prior Publication Data
US 2017/0048074 A1 Feb. 16, 2017

(51) Int. Cl.
*H04J 1/16* (2006.01)
*H04L 12/14* (2006.01)
(Continued)

(52) U.S. Cl.
CPC ...... *H04L 12/1407* (2013.01); *H04L 41/0893* (2013.01); *H04L 69/163* (2013.01); *H04W 76/15* (2018.02); *H04L 69/14* (2013.01)

(58) Field of Classification Search
CPC ......... H04L 47/10; H04L 47/30; H04L 47/11; H04L 47/12; H04L 47/35; H04L 47/32;
(Continued)

(56) References Cited

U.S. PATENT DOCUMENTS

| 2009/0196231 A1* | 8/2009 | Giaretta | H04L 12/14 370/328 |
| 2012/0182868 A1* | 7/2012 | Lovsen | H04L 47/263 370/230 |

OTHER PUBLICATIONS

3GPP TS 23.203 V12.4.0, "3rd Generation Partnership Project; Technical Specification Group Services and System Aspects; Policy and charging control architecture (Release 12)" Mar. 2014, 218 pages.
(Continued)

*Primary Examiner* — Brenda H Pham
(74) *Attorney, Agent, or Firm* — Rothwell, Figg, Ernst & Manbeck, p.c.

(57) ABSTRACT

The present disclosure relates to a method performed by a network element (5) in a Policy Control and Charging (PCC) system (2) in a communication network (1). The method comprises establishing a first Internet Protocol (IP) Connectivity Access Network (CAN) session with a first Policy and Charging Enforcement Function (PCEF) 4x in the PCC system, the first PCEF being associated with a first Public Data Network (PDN) connection X between a Multi-Path Transmission Control Protocol (MPTCP) capable radio device (6) and an MPTCP proxy (8). The method also comprises establishing a second IP-CAN session with a second PCEF 4y in the PCC system, the second PCEF being associated with a second PDN connection Y between the radio device and the MPTCP proxy. The method also comprises establishing a third IP-CAN session with a third PCEF 4z in the PCC system, the third PCEF being associated with an IP connection Z between the MPTCP proxy and a PDN 7, the IP connection being configured for carrying data from both the first PDN connection and the second PDN connection. The method also comprises establishing a fourth IP-CAN session with a Policy and Charging Rules Function (PCRF) 3 in the PCC system.

22 Claims, 12 Drawing Sheets

(51) Int. Cl.
   *H04L 12/24* (2006.01)
   *H04W 76/15* (2018.01)
   *H04L 29/06* (2006.01)

(58) Field of Classification Search
   CPC ............. H04L 2012/5631; H04L 47/15; H04L 47/2441; H04L 47/70
   USPC .... 370/310.2, 229, 235, 230, 328, 338, 349, 370/232, 233
   See application file for complete search history.

(56) References Cited

OTHER PUBLICATIONS

3GPP TS 23.401 V12.4.0, "3rd Generation Partnership Project; Technical Specification Group Services and System Aspects;General Packet Radio Service (GPRS) enhancements for Evolved Universal Terrestrial Radio Access Network (E-UTRAN) access (Release 12)," Mar. 2014, 36 pages.

3GPP TS 23.402 V12.4.0, "3rd Generation Partnership Project; Technical Specification Group Services and System Aspects; Architecture enhancements for non-3GPP accesses (Release 12)" Mar. 2014, 72 pages.

Deng., L et al., "MPTCP Proxy for Mobile Networks draft-deng-mptcp-mobile-network-proxy-00," MPTCP Working Group, Internet-Draft, https://tools.ietf.org/pdf/draft-deng-mptcp-mobile-network-proxy-00.pdf, Feb. 14, 2014, 8 pages.

International Preliminary Report on Patentability issued in International application No. PCT/SE2014/050534, dated Nov. 1, 2016, 7 pages.

International Search Report issued in International application No. PCT/SE2014/050534, dated Jan. 16, 2015, 4 pages.

\* cited by examiner

METHOD AND DEVICE OF A POLICY CONTROL AND CHARGING (PCC) SYSTEM IN A COMMUNICATION NETWORK

CROSS REFERENCE TO RELATED APPLICATION(S)

This application is a 35 U.S.C. § 371 National Phase Entry Application from PCT/SE2014/050534, filed Apr. 30, 2014, designating the United States, the disclosure of which is incorporated by reference.

TECHNICAL FIELD

The present disclosure relates to a method and device of a policy control and charging (PCC) system in a communication network using Multi-Path Transmission Control Protocol (MPTCP) with a radio device.

BACKGROUND

A basic concept in the 3GPP Evolved Packet Core (EPC) architecture is a Packet Data Network (PDN). A PDN is an Internet Protocol (IP) network. This is typically Internet, but it can also be a closed corporate network or an operator service network. A PDN has one or more names, each name represented in a string called Access Point Name (APN). A PDN gateway (PDN-GW or PGW) is a functional node that provides access to one or more PDNs. The interface between the PGW and the PDN is called SGi.

A PDN connection provides a User Equipment (UE) with an access channel to a PDN. It is a logical IP tunnel between the UE and PGW. Each PDN connection has a single IP address/prefix. A UE can setup multiple PDN connections, possibly to the same APN.

The access network between UE and PGW is either a Third Generation Partnership Program (3GPP) access or a non-3GPP access. In the former, the radio technology between UE and network is defined by 3GPP; e.g. Long Term Evolution (LTE). In the latter, the radio technology is not defined by 3GPP; e.g. Wireless Local Area Network (WLAN). A UE can setup one or more PDN connections over a 3GPP access or over a non-3GPP access or over both.

FIG. 1 shows an architecture setup where the UE is connected via LTE (E-UTRAN) to the network. User plane traffic is routed via the S5 interface. The PDN is denoted as "Operator's IP Services". This figure and other architecture variants can be found in 3GPP Technical Specification (TS) 23.401.

FIG. 2 is an architecture setup where the UE is connected to the network via a non-3GPP access. User plane traffic is routed via the S2 interface. This figure and other architecture variants can be found in 3GPP TS 23.402.

Note that a UE can setup multiple PDN connections simultaneously, possibly via multiple accesses. E.g. it is possible that a UE has one PDN connection via LTE and simultaneously one PDN connection via WLAN.

The Internet Engineering Task Force (IETF) is currently working on mechanisms that add the capability of simultaneously using multiple paths to a regular TCP session. The extensions to TCP, called multi-path TCP (MPTCP) are described in IETF Request for Comments (RFC) 6824. Architectural guidelines for multipath TCP development have been published in IETF RFC 6182. RFC 6182 defines a path as: A sequence of links between a sender and a receiver, defined in this context by a source and destination address pair.

Standard TCP/IP communication (without MPTCTP) is restricted to a single path per connection. However, in many cases, multiple paths exist between peers, e.g. in case one or both of the end-devices is multi-homed and/or has connectivity via more than one access technology. For example, in a 3GPP multi-access scenario a device (3GPP UE) may be connected via both a 3GPP access (such as GSM EDGE Radio Access Network (GERAN), UMTS Terrestrial Radio Access Network (UTRAN) and evolved UTRAN (E-UTRAN)) and WLAN access simultaneously. The simultaneous use of these multiple paths for a TCP/IP session improves resource usage within the network, and improves user experience through higher throughput and improved resilience to network failure. The use of MPTCP over multiple accesses allows the user traffic to be either routed only over one of the accesses or simultaneously over multiple accesses. It will also allow the traffic to be moved in a seamless fashion between accesses depending on coverage, radio link quality and other factors.

Because the same socket application programming interface (API) is used, MPTCP imposes no impact to the application layer. MPTCP can distribute load on available interfaces, can increase bandwidth, and allows for seamless handover between two accesses. MPTCP can run end-to-end between device and server. There can alternatively be an MPTCP proxy between device and server. With a proxy there is no need to upgrade servers with MPTCP support. Also, the proxy can do traffic steering. The latter is in particular interesting for an operator when the proxy is placed in the operator's network. The proxy may be placed in the PGW or just above the PGW on the SGi interface.

FIG. 3 is taken from 3GPP TS 23.203 and visualizes the 3GPP policy control and charging (PCC) architecture. All functional elements are defined and described in 3GPP TS 23.203. The Policy and Charging Rules Function (PCRF) is the central controller. The PCRF sends rules to a Policy and Charging Enforcement Function (PCEF), which does the actual enforcement of the rules. A PCRF may take a policy decision based on a trigger, e.g. from an Application Function (AF) or a Traffic Detection Function (TDF). There are also a Subscription Profile Repository (SPR), an Online Charging System (OCS), an Offline Charging System (OFCS) and a Bearer Binding and Event Reporting Function (BBERF).

A relevant interface is the Gx interface between PCEF and PCRF. A communication session over the Gx interface is called an IP-CAN session (IP Connectivity Access Network). 3GPP TS 23.203 defines an IP-CAN session as: The association between a UE and an IP network. The association is identified by one IPv4 and/or an IPv6 prefix together with UE identity information, if available, and a PDN represented by a PDN ID (e.g. an APN). In other words, each IP-CAN session corresponds to a PDN connection.

A PCC rule is a rule sent over an IP-CAN session from PCRF to PCEF. Such a rule consists, simplified, of the following elements: 1) a name; 2) the applicability, which is a description to which traffic this rule applies, i.e. basically a set of IP n-tuples with wildcards; 3) a policy defining what to do with the traffic this rule applies to; and 4) charging parameters.

The policy e.g. could be: Gating status, defining if traffic may pass (gate open) or not (gate close); The quality-of-service (QoS) class identifier (QCI), defining the QoS of the traffic; Uplink and downlink maximum bitrate (MBR); Uplink and downlink guaranteed bitrate (GBR); The Allocation and Retention Priority (ARP).

When PCC rules are sent to a PCEF, the PCEF may decide to setup or modify one or more bearers of the connection. A bearer uniquely identifies traffic that receives a common QoS treatment between a UE and a PDN GW. Each PDN connection has at least one bearer, the default bearer. On top of that a PDN connection may have one or more dedicated bearers.

Referring to FIG. 4, assuming we have an MPTCP proxy in the network, either co-located in the PGW or just above the PGW on SGi. One way to enforce policies would be to do the policy enforcement on the left side, between the proxy and the UE. In this approach the PCRF would see three IP addresses that are related to each other: two between the proxy and the UE, and an IP address with an Rx session for the aggregate. Note that the actual IP address value for the aggregate may be the value of the two, or it may be a new value. In the latter case the proxy is acting as a Network Address Translator (NAT).

The PCRF would need an interface towards the proxy such that it can understand how the connections are related. This new interfaces is denoted Yz in FIG. 4.

The PCRF can send access-specific rules via the two left side Gx interfaces. However, it is impossible for the PCEF to send rules that apply for the aggregate of traffic. For that to work, the PCRF will need to be able to control a PCEF to the right side of the proxy in FIG. 4. In the generic case, in order for the PCRF to have full flexibility, PCEFs on both the left and right side of the proxy are required.

Note that the MPTCP proxy may be acting as NAT, as explained above. Non-MPTCP traffic will not pass the proxy. However, such non-MPTCP traffic could still be NATed. That way, all of the UE's traffic on the right side of the proxy is aggregated in the right side connection.

The generic MPTCP PCC architecture impacts the PCRF in a number of ways:
- The PCRF needs to understand the correlation between the three different connections. This implies a new Yz interface between proxy and PCEF.
- The notion that each IP-CAN is independent and has one IP address does no longer hold.
- This causes not only a re-design of the PCRF. It also requires that the 3GPP standard for the PCRF is modified.

SUMMARY

It is an objective of the present disclosure improve the PCC in a communication network when using MPTCP with an MPTCP proxy.

According to an aspect of the present disclosure, there is provided a method performed by a network element in a Policy Control and Charging (PCC) system in a communication network. The method comprises establishing a first Internet Protocol (IP) Connectivity Access Network (CAN) session with a first Policy and Charging Enforcement Function (PCEF) in the PCC system, the first PCEF being associated with a first Public Data Network (PDN) connection between a Multi-Path Transmission Control Protocol (MPTCP) capable radio device and an MPTCP proxy. The method also comprises establishing a second IP-CAN session with a second PCEF in the PCC system, the second PCEF being associated with a second PDN connection between the radio device and the MPTCP proxy. The method also comprises establishing a third IP-CAN session with a third PCEF in the PCC system, the third PCEF being associated with an IP connection between the MPTCP proxy and a PDN, the IP connection being configured for carrying data from both the first PDN connection and the second PDN connection. The method also comprises establishing a fourth IP-CAN session with a Policy and Charging Rules Function (PCRF) in the PCC system.

According to another aspect of the present disclosure, there is provided a network element for a PCC system in a communication network. The network element comprises processor circuitry, and a storage unit storing instructions executable by said processor circuitry whereby said network element is operative to establish a first IP-CAN session with a first PCEF in the PCC system, the first PCEF being associated with a first PDN connection between an MPTCP capable radio device and an MPTCP proxy. The network element is also operative to establish a second IP-CAN session with a second PCEF in the PCC system, the second PCEF being associated with a second PDN connection between the radio device and the MPTCP proxy. The network element is also operative to establish a third IP-CAN session with a third PCEF in the PCC system, the third PCEF being associated with an IP connection between the MPTCP proxy and a PDN, the IP connection being configured for carrying data from both the first PDN connection and the second PDN connection. The network element is also operative to establish a fourth IP-CAN session with a PCRF in the PCC system.

According to another aspect of the present disclosure, there is provided a PDN gateway (PGW) comprising an embodiment of the network element of the present disclosure.

According to another aspect of the present disclosure, there is provided a PCC system for a communication network. The PCC system comprises an embodiment of the network element of the present disclosure. The PCC system also comprises the first PCEF configured for being associated with the first PDN connection between the radio device and the MPTCP proxy. The PCC system also comprises the second PCEF configured for being associated with the second PDN connection between the radio device and the MPTCP proxy. The PCC system also comprises the third PCEF configured for being associated with the aggregated PDN connection between the MPTCP proxy and the PDN. The PCC system also comprises the PCRF.

According to another aspect of the present disclosure, there is provided a computer program product comprising computer-executable components for causing a network element to perform an embodiment of the method of the present disclosure when the computer-executable components are run on processor circuitry comprised in the network element.

According to another aspect of the present disclosure, there is provided a computer program comprising computer program code which is able to, when run on processor circuitry of a network element in a PCC system, cause the network element to establish a first IP-CAN session with a first PCEF in the PCC system, the first PCEF being associated with a first PDN connection between an MPTCP capable radio device and an MPTCP proxy. The code is also able to cause the network element to establish a second IP-CAN session with a second PCEF in the PCC system, the second PCEF being associated with a second PDN connection between the radio device and the MPTCP proxy. The code is also able to cause the network element to establish a third IP-CAN session with a third PCEF in the PCC system, the third PCEF being associated with an IP connection between the MPTCP proxy and a PDN, the IP connection being configured for carrying data from both the first PDN connection and the second PDN connection. The code is also able to cause the network element to establish a fourth IP-CAN session with a PCRF in the PCC system.

According to another aspect of the present disclosure, there is provided a computer program product comprising an embodiment of the computer program of the present disclosure and a computer readable means on which the computer program is stored.

By means of the network element, herein also called a proxy PCEF (P-PCEF), MPTCP can be handled by the PCC system in a convenient way. The network element can handle the communications with the PCEF of the different connections, as well as with the PCRF, in such a way that it may not be necessary to adjust the standards for the PCEFs and PCRF for handling MPTCP, since they may be kept agnostic about the use of MPTCP.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
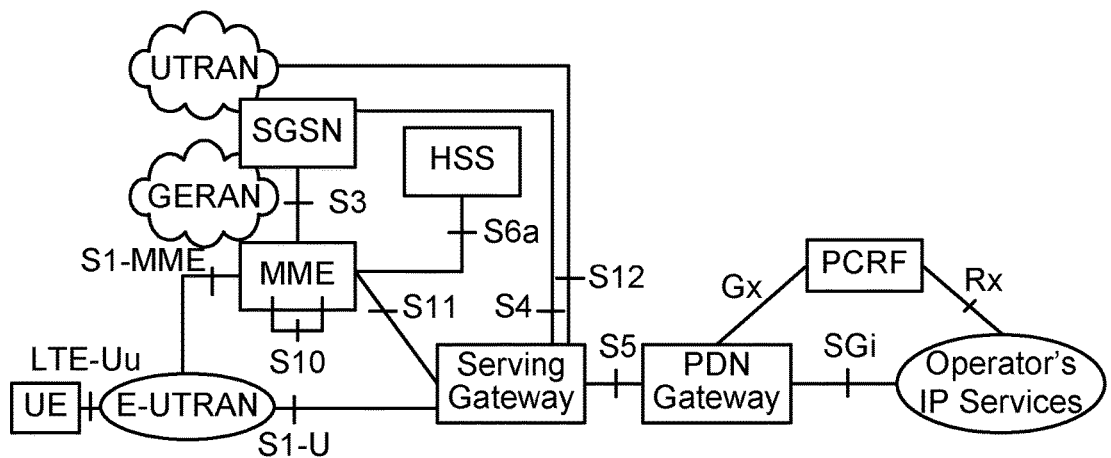
FIG. 1 illustrates a 3GPP standard architecture for 3GPP access.
Figure 2:
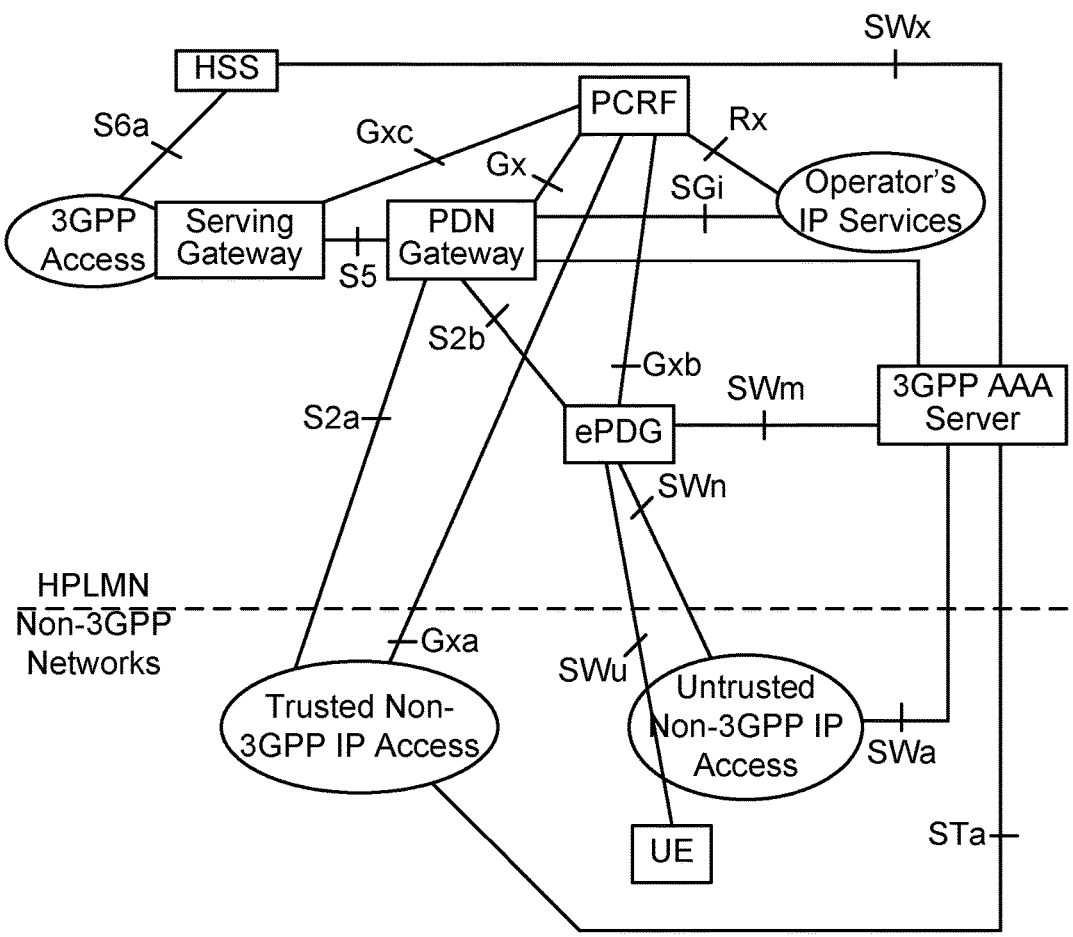
FIG. 2 illustrates a 3GPP standard architecture for non-3GPP access.
Figure 3:
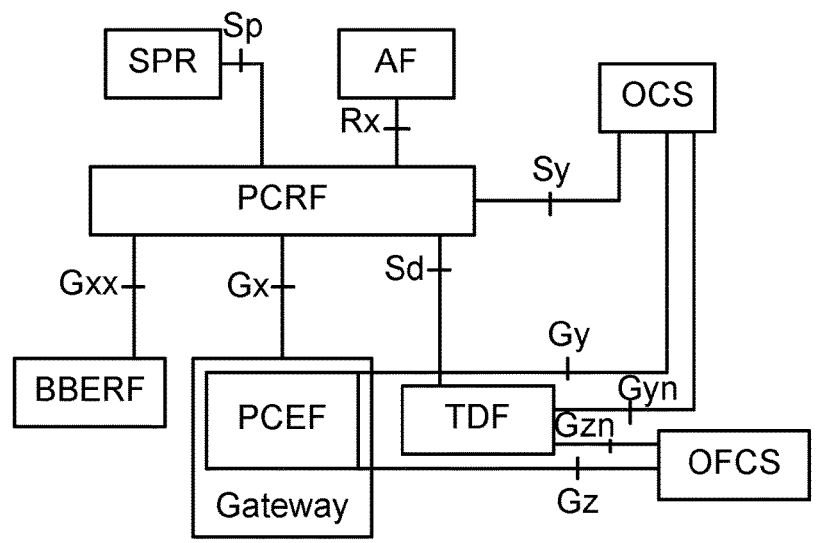
FIG. 3 illustrates a 3GPP standard architecture of a PCC system.
Figure 4:
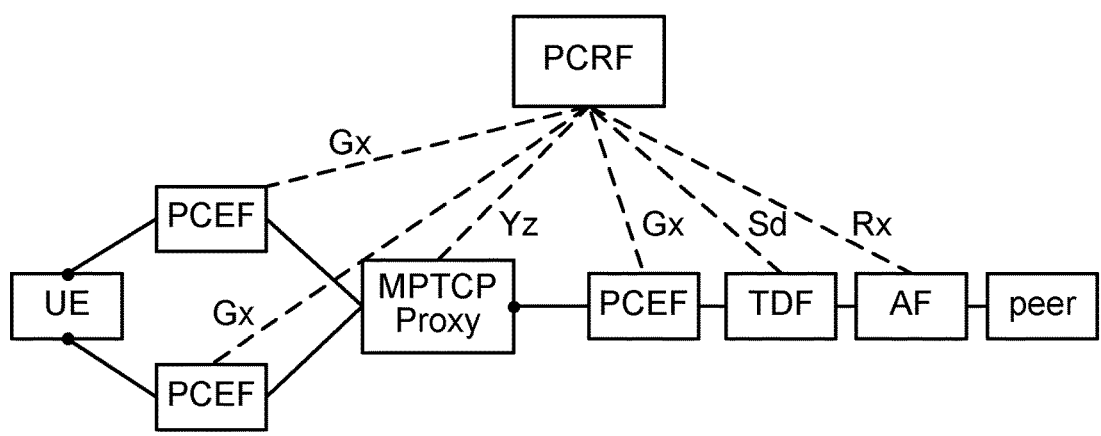
FIG. 4 illustrates a prophetic generic implementation of PCC when using MPTCP and an MPTCP proxy.
Figure 5:
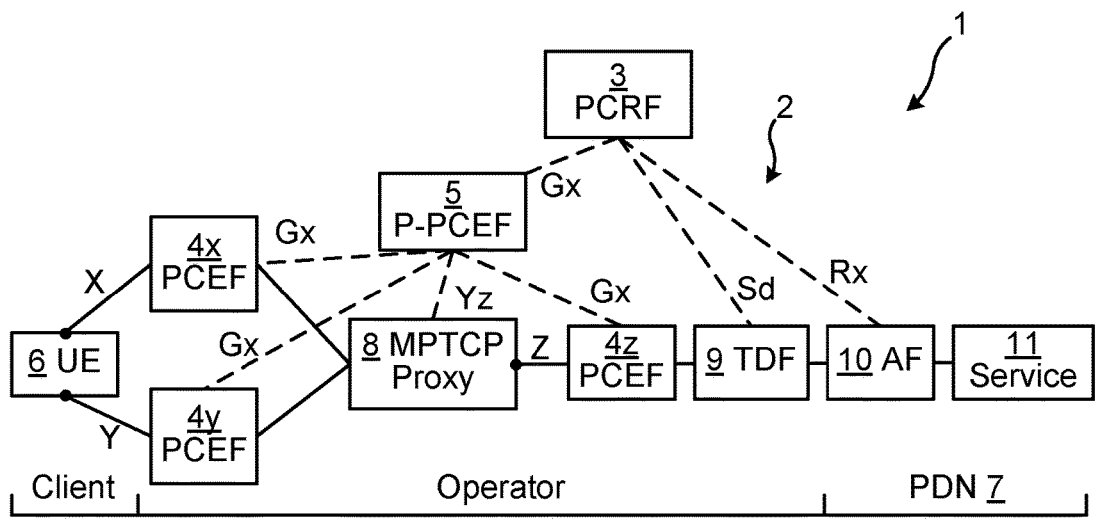
FIG. 5 is a schematic block diagram of an embodiment of a communication network in accordance with the present disclosure.

A basic idea of using the network element (P-PCEF) of the present disclosure is to hide the MPTCP complexity from the PCRF. The PCRF may not impacted by this complexity and MPTCP may be provided as a proprietary function. No standardization may be required. A generic architecture with P-PCEF is shown in FIG. 5. An advantage of the architecture is the introduction of a P-PCEF 5 on the Gx interfaces between the RCRF 3 and the PCEFs 4 of the PCC 2 in the communication network 1. The P-PCRF 5 translates between the Gx session with the PCRF 3 and the Gx sessions with the multiple PCEFs 4. The P-PCEF 5 is also the entity that terminates the Yz interface of the MPTCP proxy 8.

Referring further to FIG. 5 illustrating an embodiment of a communication network 1, the communication network 1 comprises a telecommunication operator network connected to a mobile device 6 (here also called a UE) of a subscriber of the operator and typically also a client to services 11 provided from a PDN 7 with which the operator network is also connected. The service 11 and its client UE 6 may thus communicate via the operator network. The radio device 6 may be any device or user equipment (UE), mobile or stationary, enabled to communicate over a radio cannel in a communications network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). The operator network is configured to handle MPTCP connections with MPTCP capable radio devices 6 by means of an MPTCP proxy 8 whish may merge the plurality of MPTCP subflows to a single flow to the service 11 server e.g. if the server is not MPTCP capable. A PCEF 4 is implemented on each subflow between the UE 4 and the proxy 8. Thus a first PCEF 4x is configured for controlling the first subflow, in the first PDN connection X between the UE 6 and the MPTCP proxy 8, and a second PCEF 4y is configured for controlling the second subflow, in the second PDN connection Y between the UE 6 and the MPTCP proxy 8. There could be further MPTCP subflows, such as a third and fourth subflow, which could each be associated with its own PCEF 4. As discussed above, it is also convenient to control the flow on the other side of the proxy 8 in the operator network, i.e. between the MPTCP proxy 8 and the PDN 7. Thus, a third PCEF 4z is configured for controlling the flow in the IP connection Z (could alternatively be called a third PDN connection) between the MPTCP proxy 8 and the PDN 7. In accordance with the present disclosure, each of the PCEF 4 sets up an IP-CAN session over its Gx interface to the P-PCEF 5, instead of to the PCRF 3 directly. The PCRF 3 has a single IP-CAN session with the P-PCEF 5 over a Gx interface, whereby the complexity of the PCC 2 with multiple PCEF 4 is hidden from the PCRF 3. The P-PCEF 5 may also have an interface Yz with the MPTCP proxy 8. In the embodiment of FIG. 5, the PCRF 3 may also have an Sd interface to a Traffic Detection Function (TDF) 9 in the operator network and/or an Rx interface to an application function (AF) 10 in the PDN 7.

Figure 6:
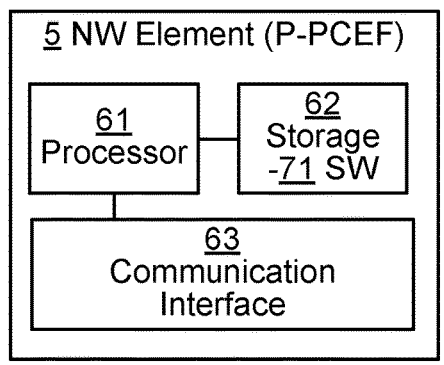
FIG. 6 is a schematic block diagram of an embodiment of a network (NW) element in accordance with the present disclosure.

FIG. 6 is a schematic block diagram of an embodiment of a network (NW) element 5 (also called P-PCEF herein) in accordance with the present disclosure. The NW element 5 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software (SW) 71 stored in a storage 62 of one or several storage unit(s) e.g. a memory, to perform an embodiment of the method od the present disclosure. The storage unit is regarded as a computer readable means as discussed herein and may e.g. be in the form of a Random Access Memory (RAM), a Flash memory or other solid state memory, or a hard disk, or be a combination thereof. The processor circuitry 61 may also be configured to store data in the storage 62, as needed. The NW element 5 also comprises a communication interface 63, e.g. comprising a transmitter and a receiver, which may be combined to form a transceiver or be present as distinct units. The communication interface 63 is configured to cooperate with the processor circuitry 61 to set up the IP-CAN sessions of the present disclosure, as well as any other communication sessions with any other node in the communication network 1. The NW element 5 may be collocated with another element in the network 1, e.g. PCRF, PCEF(s) and/or MPTCP proxy 8, whereby the NW element 5 may share hardware resources such as processor circuitry 61, storage 62 and/or communication interface 63 with such elements.

Figure 7:
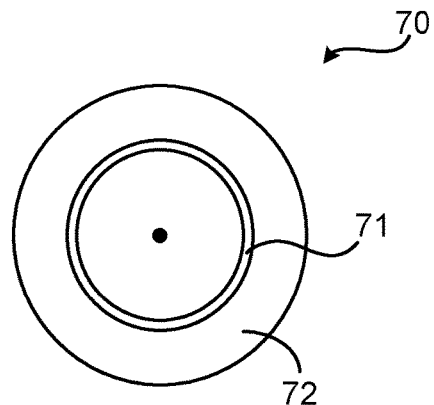
FIG. 7 schematically illustrates an embodiment of a computer program product in accordance with the present disclosure.

FIG. 7 schematically illustrates an embodiment of a computer program product 70 in accordance with the present disclosure. The computer program product 70 comprises a computer readable medium 72 comprising a computer program 71 in the form of computer-executable components 71. The computer program/computer-executable components 71 may be configured to cause a NW element 5, e.g. as discussed above, for use as a PCEF proxy in a communication network 1 to perform an embodiment of the method of the present disclosure. The computer program/computer-executable components may be run on the processor circuitry 61 of the NW element 5 for causing the element to perform the method. The computer program product 70 may e.g. be comprised in a storage unit or memory 62 comprised in the NW element 5 and associated with the processor circuitry 61. Alternatively, the computer program product 70 may be, or be part of, a separate, e.g. mobile, storage means, such as a computer readable disc, e.g. CD or DVD or hard disc/drive, or a solid state storage medium, e.g. a RAM or Flash memory.

Figure 8A:
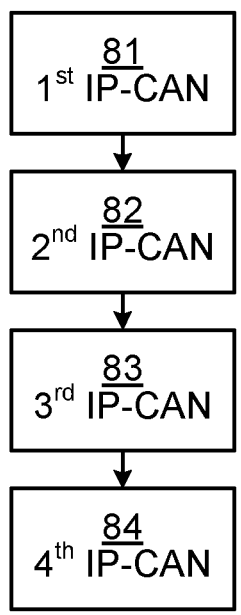
FIG. 8a is a schematic flow chart of an embodiment of a method in accordance with the present disclosure.

FIG. 8a is a schematic flow chart of an embodiment of a method in accordance with the present disclosure. The method is performed by the network element 5 in a PCC system 2 in a communication network 1. The network element 5 establishes 81a first IP-CAN session with a first PCEF 4x in the PCC system 2. IP-CAN is defined in 3GPP TS 23.203. The first PCEF is associated with a first PDN connection X between an MPTCP capable radio device 6 and an MPTCP proxy 8. The network element 5 also establishes 82 a second IP-CAN session with a second PCEF 4y in the PCC system 2, the second PCEF being associated with a second PDN connection Y between the radio device 6 and the MPTCP proxy 8. The network element 5 also establishes establishing 83 a third IP-CAN session with a third PCEF 4z in the PCC system, the third PCEF being associated with an IP connection Z between the MPTCP proxy 8 and a PDN 7, the IP connection Z being configured for carrying data from both the first PDN connection X and the second PDN connection Y. The IP connection Z may e.g. be a (third) PDF connection. The network element 5 also establishes 84 a fourth IP-CAN session with a PCRF 3 in the PCC system 2. Thus, n accordance with the present disclosure, the network element/P-PCEF 5 establishes at least four IP-CAN sessions. It should be noted that they may be established in any order, sequentially or concurrently, as convenient. Although all IP-CAN sessions are established, not all may be needed for performing any one PCC action.

Figure 8B:
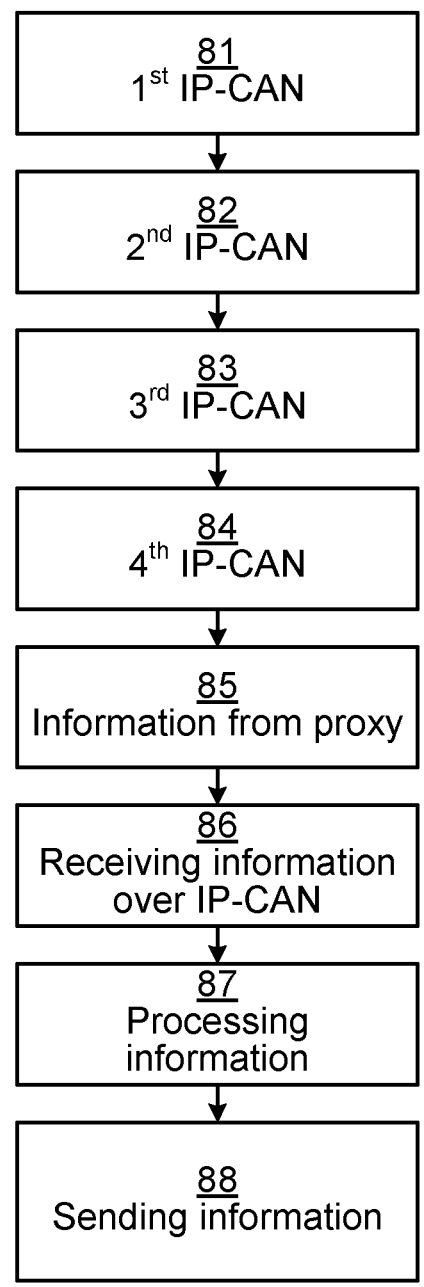
FIG. 8b is a schematic flow chart of another embodiment of a method in accordance with the present disclosure.

FIG. 8b is a schematic flow chart of another embodiment of a method in accordance with the present disclosure. The establishing 81-84 of the four IP-CAN sessions are as discussed in relation to FIG. 8a.

In some embodiments, the NW element 5 may receive 85 information from the MPTCP proxy 8, over an interface Yz between the network element 5 and the MPTCP proxy 8, about an internal relationship between the first PDN connection X, the second PDN connection Y and the IP connection Z. Thus, the network element 5 will be informed that e.g. PDN connection X hosts a first MPTCP subflow and PDN connection Y hosts a second MPTCP subflow, and that these subflows are aggregated in the IP connection Z. This may be particularly convenient if the proxy 8 acts as a NAT.

In some embodiments, the NW element 5 may receive 86 information over any of the established first, second, third and fourth IP-CAN sessions. the NW element 5 may then process 87 the received 86 information to obtain processed information, and send 88 the processed 87 information over any of the established first, second, third and fourth IP-CAN sessions other than the IP-CAN session used for the receiving 87 information. For instance, a rule may be received 86 from the PCRF 3, processed 87 into rules for the affected PCEF(s) 4, which are then sent 88 to said PCEF(s). Alternatively, traffic information may be received 86 from PCEF(s) 4, which is processed 87 and sent 88 to the PCRF 3. Thus, in some embodiments, the processing 87 comprises obtaining a rule for enforcement on data traffic between the radio device 6 and the PDN 7 in any of the first PDN connection X, the second PDN connection Y and the IP connection Z, and wherein the sending 88 the processed information comprises sending instructions relating to the obtained rule. In some embodiments, the receiving 86 information comprises receiving a first PCC Rules Provision message from the PCRF 3 over the interface Gx between the network element 5 and the PCRF, and wherein the processing 87 comprises processing a rule from the received 86 first PCC Rules Provision message. In some embodiments, the sending 88 instructions comprises sending at least a second PCC Rules Provision message, resulting from said processing 87, to any of the first, second and third PCEF 4 and/or to the MPTCP proxy 8. In some embodiments, the second PCC Rules Provision message is sent to the third PCEF 4z and/or to the MPTCP proxy 8 and comprises a rule for maximum bit rate (MBR) allowed between the radio device 6 and the PDN 7. In some other embodiments, the second PCC Rules Provision message is sent to the first PCEF 4x and/or to the second PCEF 4y, and comprises rules for guaranteed bit rate (GBR) and/or rules for quality class indicator (QCI) enforcement between the radio device 6 and the PDN 7. In yet other embodiments, the receiving 86 information comprises receiving information about a charging event from one of the first, second or third PCEF 4, and the sending 88 processed information may then comprise sending processed charging information to the PCRF 3. Some example embodiments are further discussed later in this disclosure.

In some embodiments, the establishing 84 a fourth IP-CAN session is triggered by the establishing 81 a first IP-CAN session, the establishing 82 a second IP-CAN session and/or the establishing 83 a third IP-CAN session.

Alternatively, the fourth IP-CAN session may be established 84 regardless of the establishing of the first, second and third IP-CAN sessions.

Figure 9A:
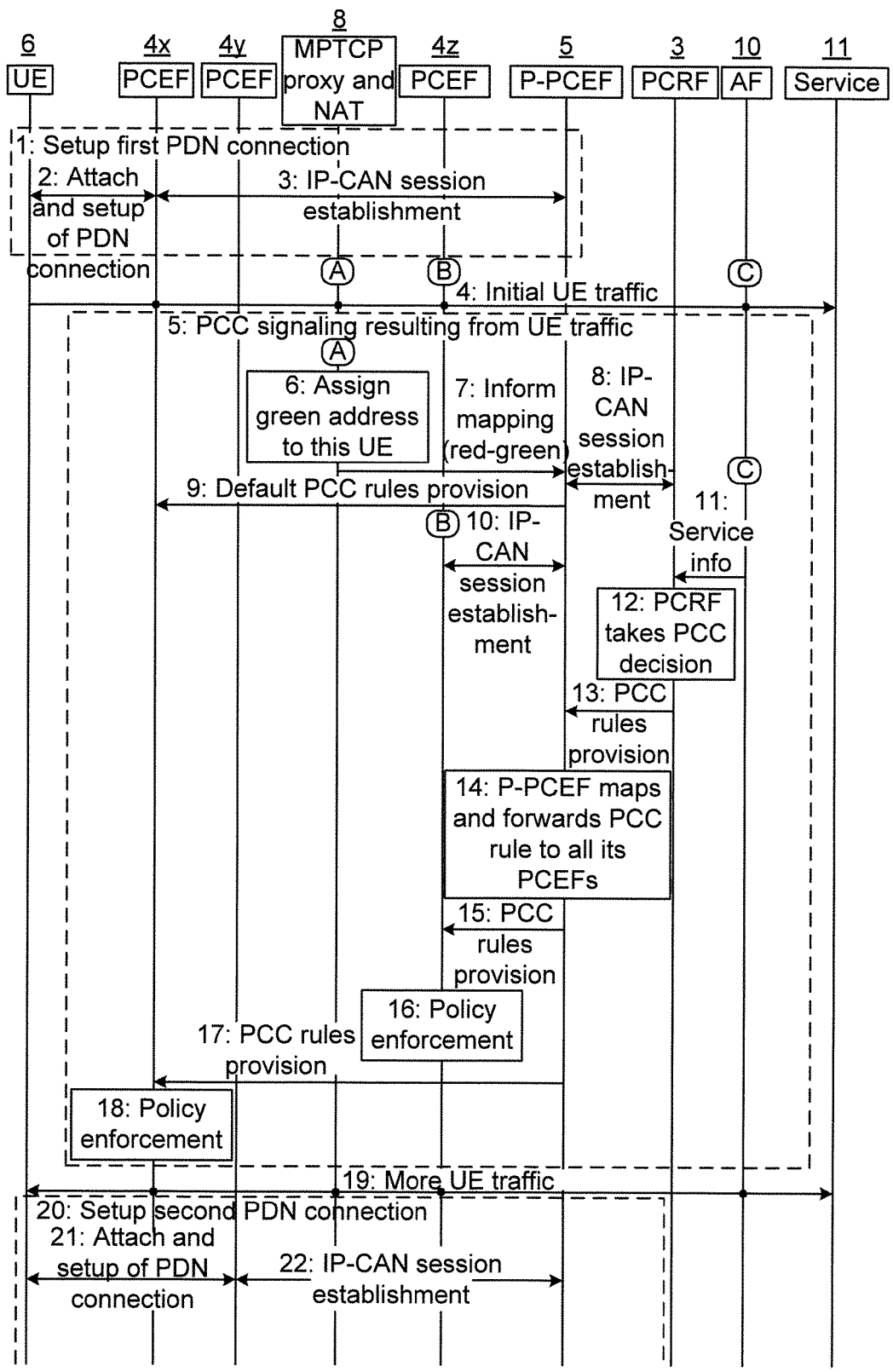
FIGS. 9A-B is a schematic signalling diagram of an example embodiment of the present disclosure.
Figure 9B:
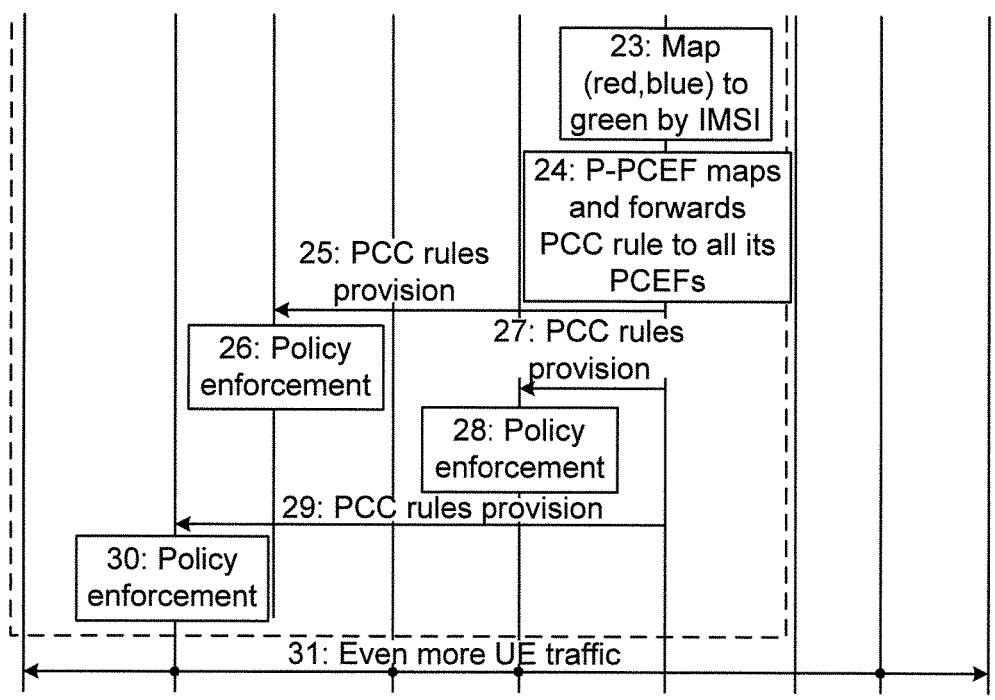

FIGS. 9A-B (spanning drawing pages 5 and 6) is a schematic signalling diagram of an example embodiment of the present disclosure. The diagram explains how the different IP-CAN sessions are setup in a scenario where a P-PCEF 5 is used. The setting up of other sessions, like over Rx and Sd, is not covered here. In addition to the text in the figure, some steps are discussed below.

In step 2, the UE 6 attaches to the network 1 and a PDN connection X is setup. Existing procedures are used here; e.g 3GPP TS 23.401 section 5.3.2.1 when the access is in LTE, or 3GPP TS 23.402 section 16.2 when the access is an operator-managed WLAN.

In step 3 the first IP-CAN session is established according to existing procedures; e.g. 3GPP TS 23.203 section 7.2. Normally, the IP-CAN session goes towards a PCRF 3. A PCRF is selected by a Diameter Router Agent (DRA) according to the procedure in 3GPP TS 23.203 section 7.6. The DRA has information about the user identity (e.g. International mobile subscriber identity, IMSI), the APN and the UE IP address(es). Here, however, the DRA selects the P-PCEF 5 instead of the PCRF 3. Instead of the DRA storing the PCRF address, it stores the P-PCEF address. When setting up the first IP-CAN session, the P-PCEF 5 may have default PCC 2 rules that can be sent to the first PCEF 4x.

In step 6 the MPTCP proxy 8 has received some traffic of the first PDN connection X. It then decides what address to use for the IP connection Z. It then informs the P-PCEF 5 about the mapping first PDN connection-IP connection in step 7. The proxy 8 may find the right instance of the P-PCEF 5 according to a DRA-based procedure as in step 3. Such DRA can use at least the UE IP address of the first PDN connection X in order to find the correct P-PCEF 5. Additional information like user identity or APN may in certain cases also be made available to the DRA. At this point in time, the DRA can also store the UE IP address. However, step 6 may be optional and only occur when the proxy 8 acts as NAT. If it does not acts as NAT, then step 7 does not occur either.

In step 8 the P-PCEF performs an IP-CAN session establishment according to the existing procedure that an ordinary PCEF would use. A PCRF 3 is selected by the DRA according to existing procedure. After the fourth IP-CAN session establishment, the P-PCEF 5 may receive 86 default PCC rules that can be further sent 88 to the first PCEF 4x.

In step 10, the third PCEF 4z sets up the third IP-CAN session. It uses the existing procedure, but the DRA now selects the correct P-PCEF 5 based on the IP address of the UE 6 of the IP connection Z that was stored in step 7.

In step 11 the AF 10 signals service information to the PCRF 3, which triggers the PCRF to make a policy decision. Alternatively, the PCRF 3 can be triggered to take a policy decision by other means as well (e.g. by the TDF).

In step 12 the PCRF 3 takes a policy decision and sends an updated PCC rule set to the P-PCEF 5 in step 13. This is all according to existing procedure. The PCRF 3 sees no difference between a P-PCEF 5 and an ordinary PCEF 4.

In step 14 the P-PCEF 5 maps the received 86 PCC rules to PCC rules for the first PDN connection. The P-PCEF 3 then sends 86 these rules to all its PCEF 4 (steps 15-18) according to existing procedures from 3GPP TS 23.203.

At a later point in time, the UE 6 may setup a second PDN connection Y via a second access. This is step 21. This results in the setup 82 of a second IP-CAN session, in a similar way as in step 3. Also here, the DRA selects a P-PCEF 5 instead of a PCRF 3. In step 22 the DRA has information about the user identity (e.g. IMSI), the APN and the UE IP address(es) of the second PDN connection Y. At least the user identity can be used to ensure that the second IP-CAN session ends up at the same P-PCEF 5 as the first IP-CAN session.

After step 22, the P-PCEF 5 knows the mapping second PDN connection Y to IP connection Z, and thereby it knows that they are correlated. It may do a new mapping of the received 86 rules to rules for each of the first and second PDN connections X and Y, similar to step 14. Rules are then sent 88 to the second PCEF 4y (step 25), and optionally updated rules are sent to the first and third PCEF (steps 27 and 29).

The actual policy enforcement (steps 16, 18, 26, 28, 30) is according to existing procedures in TS 23.203 and may include the setup or modification of bearers.

In FIGS. 9A-B, it is assumed that (A), (B) and (C) are triggered by user-plane traffic. The consequence of user-plane traffic as trigger is that the fourth IP-CAN session is not setup until traffic is sent. As a result, no default PCC rules for the first IP-CAN session can be received from the PCRF 3 at IP-CAN establishment. Instead the P-PCEF 5 may provide such rules.

Several optimizations to the above may be possible, depending on deployment scenario. Some contemplated examples are given below.

The network element (i.e. the P-PCEF discussed herein) 5 may be co-located with the MPTCP proxy 8 and/or with any of the first, second and third PCEF:s 4, e.g. in a PGW. For instance, if the first, second and third PCEF 4, the MPTCP proxy 8 (typically acting as NAT) and the P-PCEF 5 are all co-located, then (A) and (B) can be triggered by the setup of the first or second red PDN connection X or Y (see FIGS. 10A-B). For instance, (A) and (B) could be triggered by sniffing control plane traffic or by routing control plane traffic through the proxy 8 and one of the PCEF 4. E.g., the signalling between the PGW and the Authentication Authorization and Accounting (AAA) element at authentication and PDN connection setup.

Figure 11A:
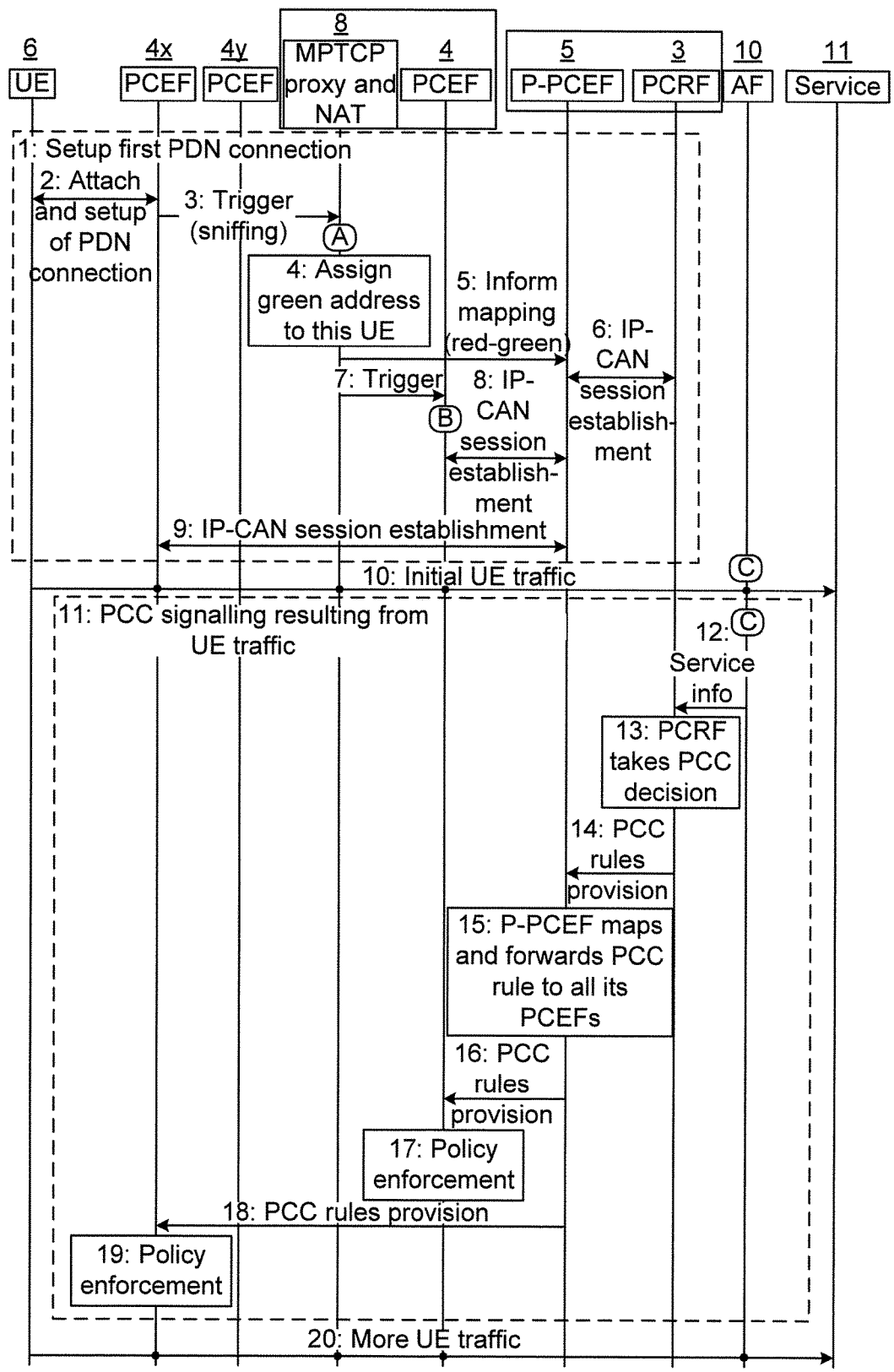
FIGS. 11A-B is a schematic signalling diagram of another example embodiment of the present disclosure.
Figure 11B:
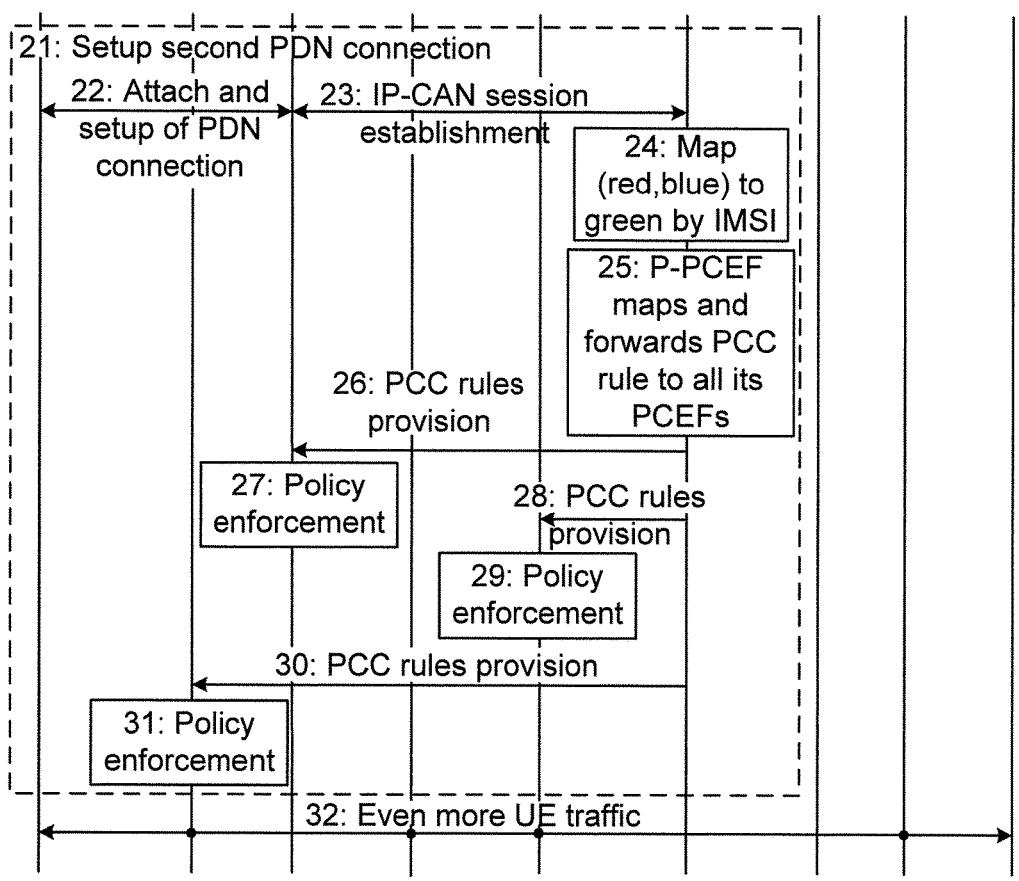

If the P-PCEF 5 is co-located with the PCRF 3, then default PCC rules can already be provided in step 3 (see FIGS. 11A-B).

If the MPTCP proxy/NAT 8 and the third PCEF 4z are co-located, then (A) can trigger (B).

The NAT, (A), could be triggered by a signal from the first or second PCEF 4x or 4y upon establishment of the first or second PDN connection X or Y. This may require an additional interface between said PCEF and NAT, possibly the MPTCP proxy 8.

If the P-PCEF 5 can resolve the location of the NAT, e.g. because P-PCEF and NAT are co-located, then the P-PCEF could trigger (A) at the establishment of the first PDN connection X (step 3). The P-PCEF could first setup the fourth IP-CAN session towards the PCRF 3, deduce the default PCC rules, and reply those to the first PCEF 4x as part of the first IP-CAN session setup.

The applicability of these different optimizations depends on the deployment. The two FIGS. 10A-B and 11A-B give two deployment examples. In each example some of the optimizations are used.

Figure 10A:
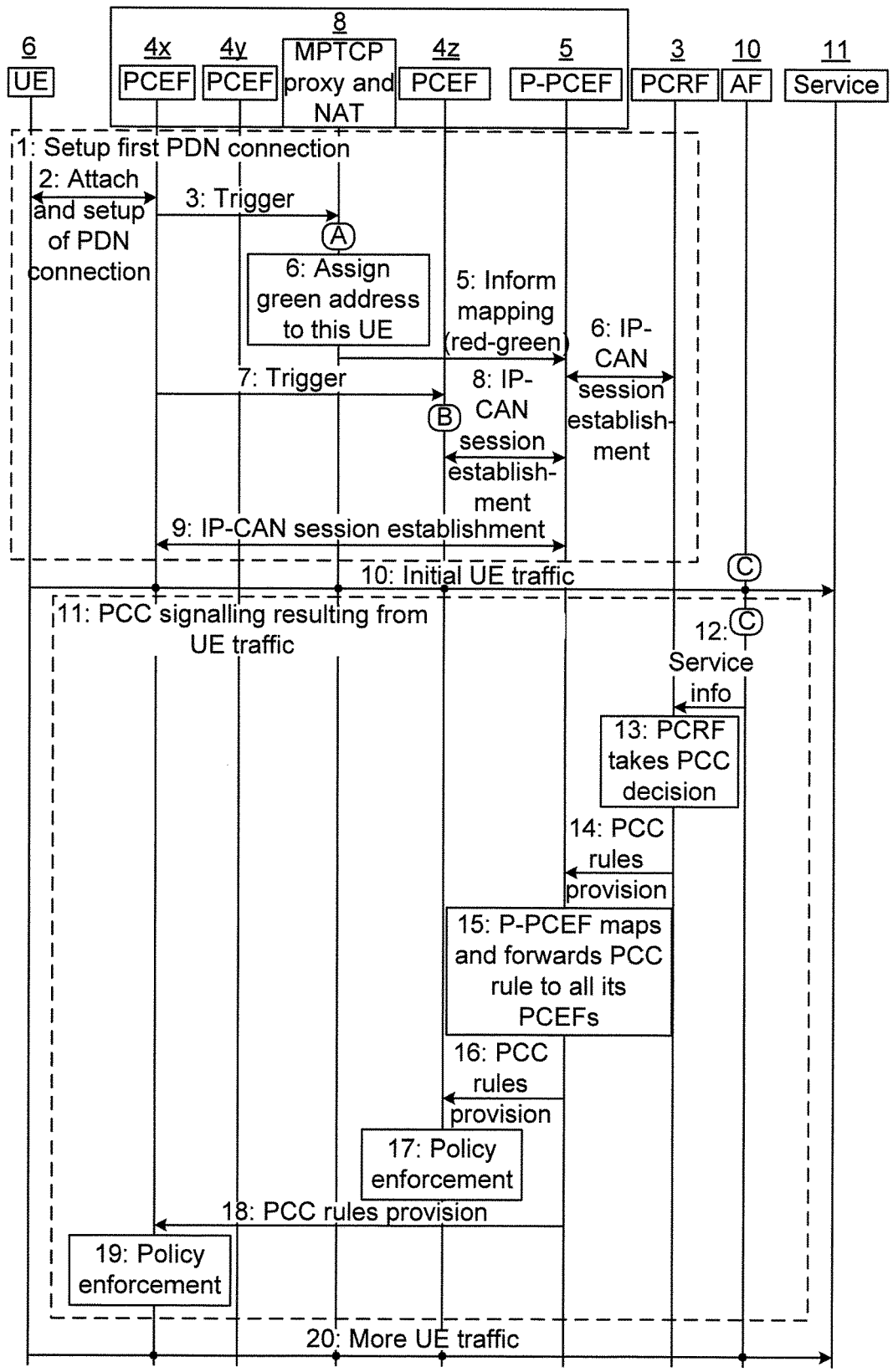
FIGS. 10A-B is a schematic signalling diagram of another example embodiment of the present disclosure.
Figure 10B:
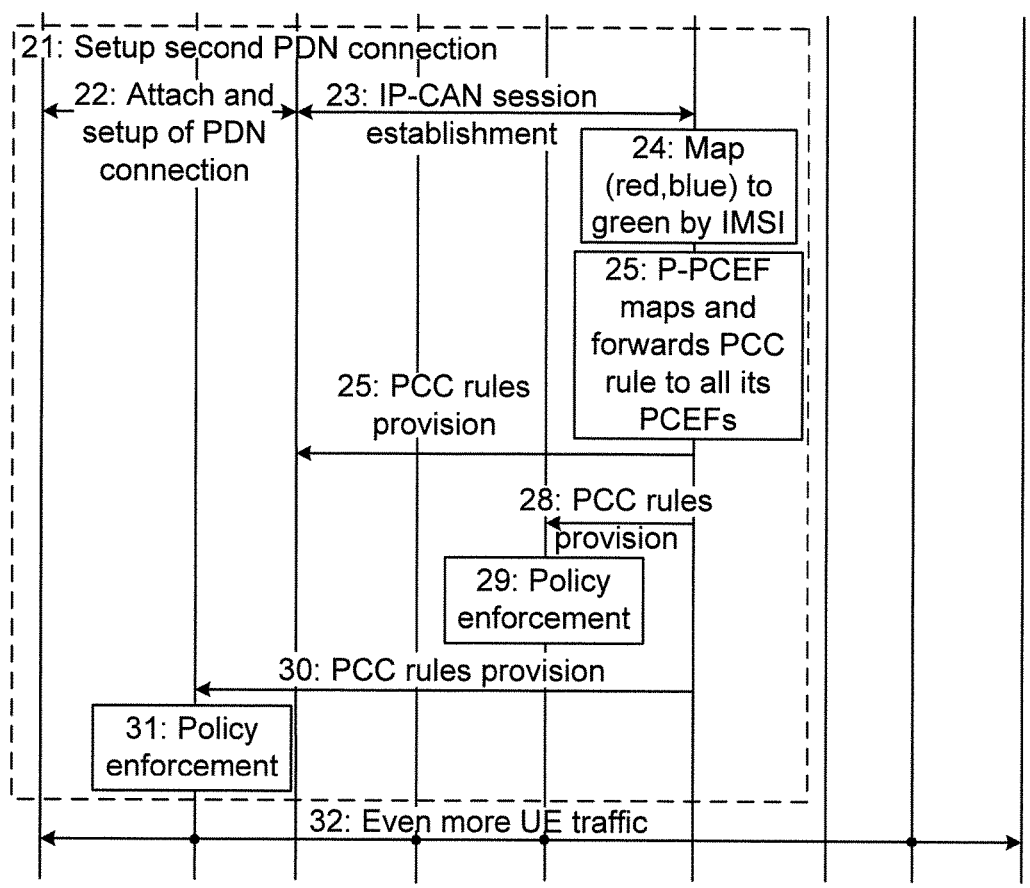

The signalling of FIGS. 10A-B (spanning drawing pages 7 and 8) is derived from the generic signalling case of FIGS. 9A-B and covers the specific scenario of co-location of the first, second and third PCEF 4, the MPTCP proxy/NAT 8 and the P-PCEF 5 in a PGW node. Some of the optimizations described in the previous section are used. Note that this signalling assumes that the first and second PDN connections X and Y end up on the same PGW node. This may not be trivial because the current 3GPP specification says that multiple PDN connections towards the same APN shall be routed over the same access. And if the first and second PDN connections would use different APNs, then the current 3GPP specification does not ensure that these PDN connections would end up on the same PGW. However, a proprietary solution to this problem has been defined and will not be further discussed herein.

The signalling of FIGS. 11A-B (spanning drawing pages 9 and 10) is also derived from the generic signalling of FIGS. 9A-B and describes the specific scenario of co-location of the P-PCEF 5 with the PCRF 3, as well as co-location of the MPTCP proxy/NAT 8 with the third PCEF 4z. Also here, some of the optimizations described above are used.

In both these specific scenarios of FIGS. 10A-B and 11A-B, default PCC rules from the PCRF 3 for the first and second PCEFs 4x and 4y can be setup already at setup of the first PDN connection X.

Figure 12A:
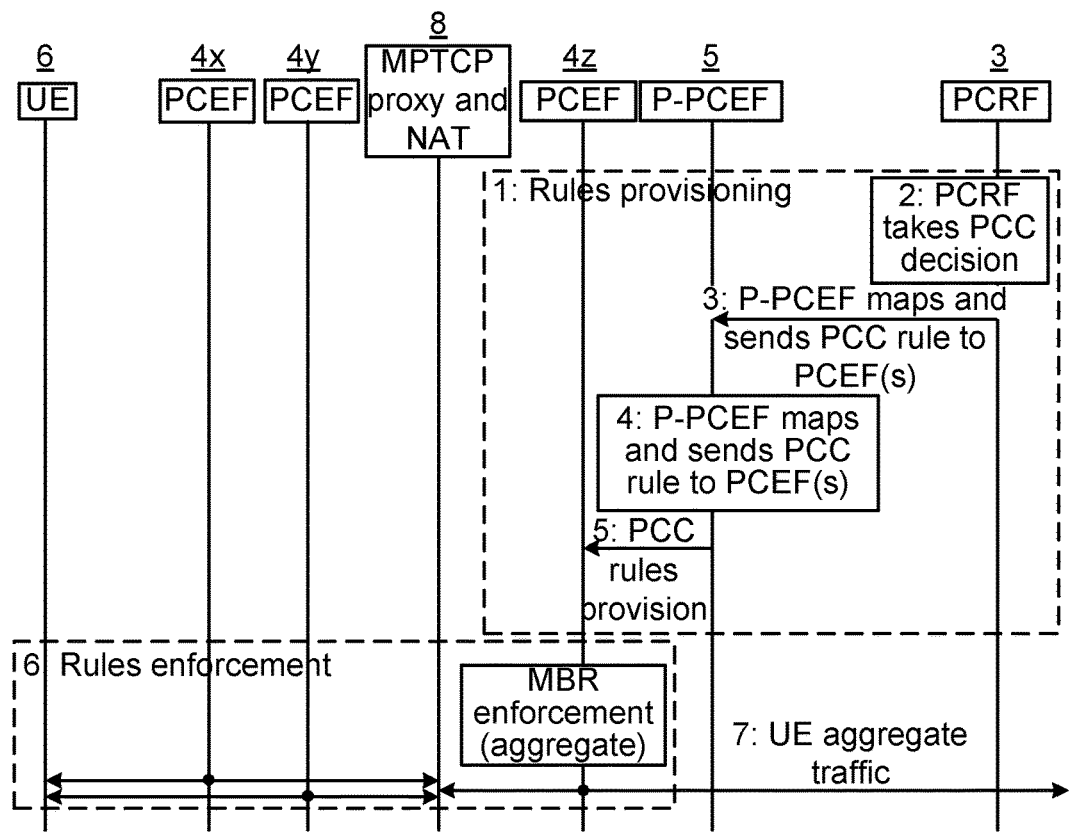
FIG. 12a is a schematic signalling diagram of an example implementation of the present disclosure.
Figure 12B:
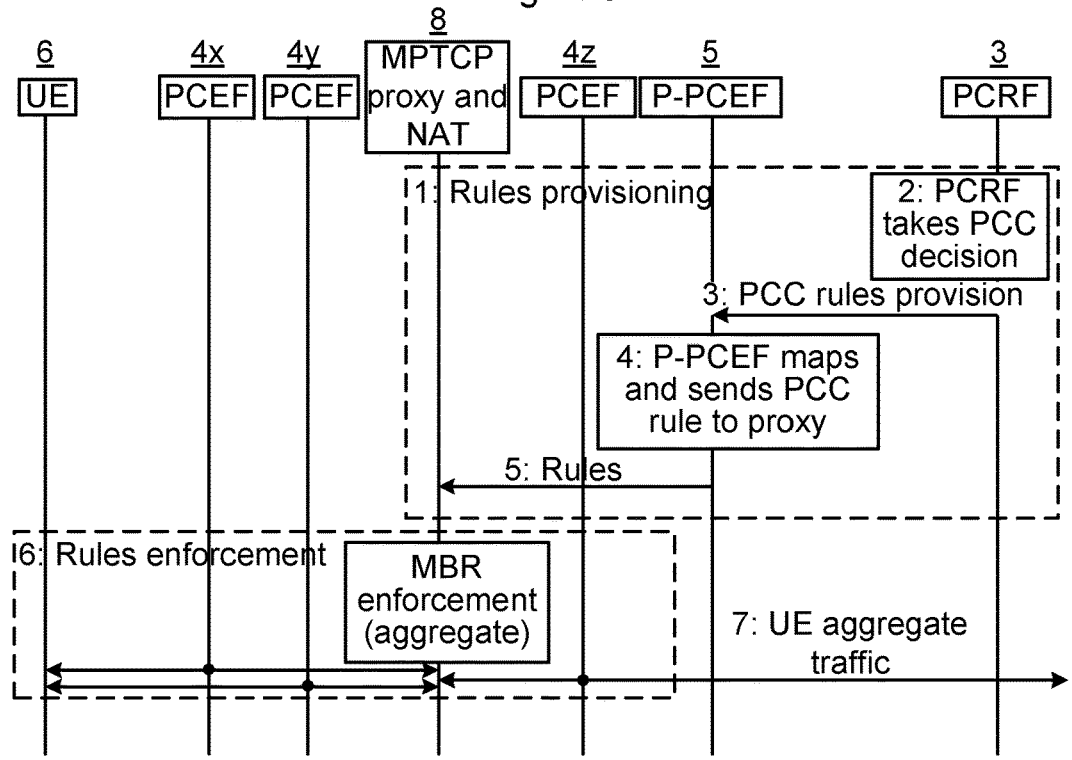
FIG. 12b is a schematic signalling diagram of another example embodiment of the present disclosure.
Figure 12C:
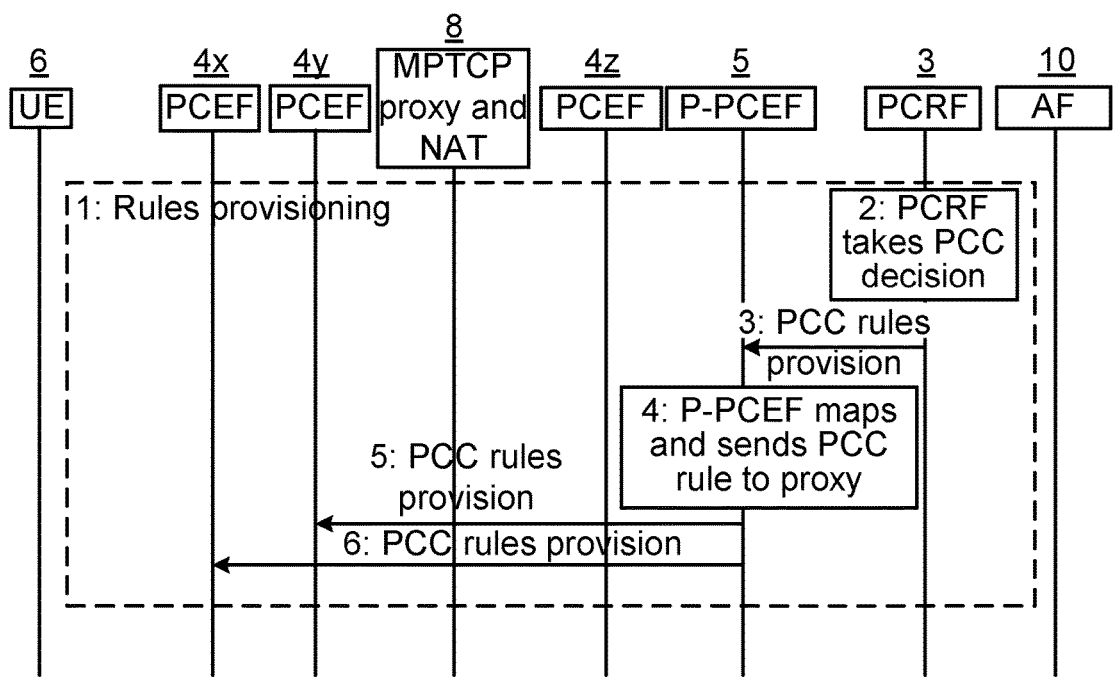
FIG. 12c is a schematic signalling diagram of another example implementation of the present disclosure.

With reference to FIGS. 12a-12c, some examples of PCC policy enforcement when a network element 5 in accordance with the present disclosure is used are briefly discussed below. This section explains how the P-PCEF 5 maps rules it receives 86 from the PCRF 3 to rules it sends 88 to the PCEFs 4. Four main PCC use cases are listed: MBR enforcement, GBR enforcement, QCI enforcement and charging. In the examples given below, the PCRF 3 may be unaware of the fact that MPTCP is used. In fact, it may be unaware which access/PDN connection is used to route the traffic at a particular moment. This raises the question what access type (radio access technology (RAT) type) should be used in the setup of the fourth IP-CAN session towards the PCRF 3 (see step 8 in FIGS. 9A-B). If the first PDN connection access is LTE and the second PDN connection access is WLAN, there is a question of whether the RAT type of the fourth IP-CAN session should be LTE or WLAN. Both are possible, and the PCRF 3 can thus be fooled in order to limit impact. Alternatively, a new access type "agnostic" may be defined.

Example 1—MBR Enforcement (FIGS. 12a and 12b)

MBR enforcement may be implemented as illustrated in FIG. 12a. The P-PCEF 5 maps the rules it receives 86 from the PCRF 3 to rules for the third PCEF 4z. The PCEF 4z does MBR enforcement both for the uplink and for the downlink. Alternatively, the P-PCEF 5 sends 88 the enforcement rules to the MPTCP proxy 8 instead, as illustrated in FIG. 12b. The proxy 8 then enforces the MBR for both uplink and downlink.

Example 2—GBR Enforcement (FIG. 12c)

When the PCRF 3 sends a rule to the P-PCEF 5 specifying that GBR=x Mbps, the question is how the P-PCEF 5 should handle such a rule. GBR enforcement needs to be handled in by the first and second PCEFs 4x and 4y, not by the third PCEF 4z. An alternative is that the P-PCEF 5 sends 88 the rule that GBR=x Mbps to both the first and second PCEFs. This gives full freedom to the MPTCP scheduler where to route what. However, it may cause an overbooking of resources. Alternatively, the P-PCEF 5 sends 88 the rule that GBR=ax Mbps to the first PCEF 4x and GBR=bx Mbps to the second PCEF 4y, where a+b=1. But how to pick the values a and b is then a question. The P-PCEF 5 could first try the first PCEF with a request for x Mbps, and see how much it gets there. After that it tries the second PCEF, in order to get the rest there. A problem may be that both the first and second PCEFs can provide some portion of the GBR, with a result that a+b<1.

A more feasible option may be that the P-PCEF 5 first tries GBR=x Mbps with the first PCEF, and if that fails tries the same with the second PCEF. If both fail, the P-PCEF 5 may inform the PCRF 3 via Gx. Once a dedicated bearer is established and the access network later removes the dedicated bearer because it cannot sustain the GBR, the P-PCEF 5 may repeat the process of selecting access. This alternative could be further refined with a policy in the P-PCEF 5, e.g. prefer an LTE access if available. One reason why the access is no longer able to sustain the GBR may be that the bearer is dropped in favour of a bearer with a higher priority in its ARP flag.

In this example, there may be no need for the P-PCEF 5 to inform the MPTCP proxy 8 which PDN connection provides GBR. The scheduler may simply route to whichever PDN connection X and/or Y is available. If the proxy routes via a PDN connection X that does not provide GBR, and the available bandwidth of the traffic through that connection falls below x MBPs, then the scheduler may automatically start to use the other PDN connection Y. In this way, if one connection provides x Mbps GBR, the aggregate traffic will always have at least x Mbps at its disposal.

Example 3—QCI Enforcement

For QCI enforcement, a corresponding solution can be used as for GBR enforcement.

Example 4—Charging

When it comes to charging, the PCRF 3 may only see charging events coming via the Gx from the P-PCEF 5. It is then up to the P-PCEF 5 to map charging events from the first, second and/or third PCEF 4 to events sent over the Gx towards the PCRF 3.

Below follow another aspect of the present disclosure.

According to an aspect of the present disclosure, there is provided a network element 5 for a PCC system 2 in a communication network 1. The network element comprises means (e.g. the processor circuitry 61 in cooperation with the communication interface 63) for establishing 81 a first IP-CAN session with a first PCEF 4x in the PCC system 2, the first PCEF being associated with a first PDN connection X between an MPTCP capable radio device 6 and an MPTCP proxy 8. The network element also comprises means (e.g. the processor circuitry 61 in cooperation with the communication interface 63) for establishing 82 a second IP-CAN session with a second PCEF 4y in the PCC system 2, the second PCEF being associated with a second PDN connection Y between the radio device 6 and the MPTCP proxy 8. The network element also comprises means (e.g. the processor circuitry 61 in cooperation with the communication interface 63) for establishing 83 a third IP-CAN session with a third PCEF 4z in the PCC system, the third PCEF being associated with an IP connection Z between the MPTCP proxy 8 and a PDN 7, the IP connection Z being configured for carrying data from both the first PDN connection X and the second PDN connection Y. The network element also comprises means (e.g. the processor circuitry 61 in cooperation with the communication interface 63) for establishing 84 a fourth IP-CAN session with a PCRF 3 in the PCC system 2.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network element in a Policy Control and Charging (PCC) system in a communication network, the method comprising:
   establishing a first Internet Protocol Connectivity Access Network (IP-CAN) session with a first Policy and Charging Enforcement Function (PCEF) in the PCC system, the first PCEF being associated with a first Public Data Network (PDN) connection between a Multi-Path Transmission Control Protocol (MPTCP) capable radio device and an MPTCP proxy;
   establishing a second IP-CAN session with a second PCEF in the PCC system, the second PCEF being associated with a second PDN connection between the radio device and the MPTCP proxy;
   establishing a third IP-CAN session with a third PCEF in the PCC system, the third PCEF being associated with an Internet Protocol (IP) connection between the MPTCP proxy and a PDN, the IP connection being configured for carrying data from both the first PDN connection and the second PDN connection; and
   establishing a fourth IP-CAN session with a Policy and Charging Rules Function (PCRF) in the PCC system.

2. The method of claim 1, further comprising:
   receiving information from the MPTCP proxy, over an interface between the network element and the MPTCP proxy, about an internal relationship between the first PDN connection, the second PDN connection and the IP connection.

3. The method of claim 1, further comprising:
   receiving information over any of the established first, second, third and fourth IP-CAN sessions;
   processing the received information to obtain processed information; and
   sending the processed information over any of the established first, second, third and fourth IP-CAN sessions other than the IP-CAN session used for the receiving information.

4. The method of claim 3, wherein the processing comprises obtaining a rule for enforcement on data traffic between the radio device and the PDN in any of the first PDN connection, the second PDN connection and the IP connection, and wherein the sending the processed information comprises sending instructions relating to the obtained rule.

5. The method of claim 4, wherein the receiving information comprises receiving a first PCC Rules Provision message from the PCRF over the interface between the network element and the PCRF, and wherein the processing comprises processing a rule from the received first PCC Rules Provision message.

6. The method of claim 5, wherein the sending instructions comprises sending at least a second PCC Rules Provision message, resulting from said processing, to any of the first, second and third PCEF and/or to the MPTCP proxy.

7. The method of claim 6, wherein the second PCC Rules Provision message is sent to the third PCEF and/or to the MPTCP proxy and comprises a rule for maximum bit rate, MBR, allowed between the radio device and the PDN.

8. The method of claim 6, wherein the second PCC Rules Provision message is sent to the first PCEF and/or to the second PCEF, and comprises rules for guaranteed bit rate, GBR, and/or rules for quality class indicator, QCI, enforcement between the radio device and the PDN.

9. The method of claim 3, wherein the receiving information comprises the network element receiving information about a charging event from one of the first, second and third PCEF, and wherein the sending processed information comprises the network element sending to the PCRF information about said charging event.

10. The method of claim 1, wherein the establishing a fourth IP-CAN session is triggered by the establishing a first IP-CAN session, the establishing a second IP-CAN session and/or the establishing a third IP-CAN session.

11. The method of claim 1, further comprising:
   the network element receiving a first PCC rules provision message from the PCRF, the first PCC rules provision message comprising information specifying a guaranteed bit rate (GBR) between the radio device and the PDN; and
   in response to receiving the first PCC rules provision message, the network element sending to the first PCEF a second PCC rules provision message comprising said information specifying said GBR.

12. The method of claim 11, further comprising:
   the network element sending a third PCC rules provision message to the second PCEF, the third PCC rules provision message comprising said information specifying said GBR.

13. The method of claim 12, further comprising:
   the network element receiving from the first PCEF an indication that the specified GBR cannot be supported, wherein
   the network element performs the step of transmitting the third PCC rules provision message to the second PCEF as a result of receiving the indication from the first PCEF.

14. The method of claim 1, further comprising:
   the network element receiving a first PCC rules provision message from the PCRF, the first PCC rules provision message comprising information specifying a maximum bit rate (MBR) between the radio device and the PDN; and in response to receiving the first PCC rules provision message, the network element transmitting a second PCC rules provision message comprising said information specifying said MBR, wherein the network elements transmits the second PCC rules provision message to one of: i) the third PCEF and ii) the MPTCP proxy.

15. A network element for a Policy Control and Charging (PCC) system in a communication network, the network element comprising:

processor circuitry; and a storage unit storing instructions executable by said processor circuitry whereby said network element is operative to:

establish a first Internet Protocol, IP, Connectivity Access Network, CAN, session with a first Policy and Charging Enforcement Function (PCEF) in the PCC system, the first PCEF being associated with a first Public Data Network (PDN) connection between a Multi-Path Transmission Control Protocol (MPTCP) capable radio device and an MPTCP proxy;

establish a second IP-CAN session with a second PCEF in the PCC system, the second PCEF being associated with a second PDN connection between the radio device and the MPTCP proxy;

establish a third IP-CAN session with a third PCEF in the PCC system, the third PCEF being associated with an IP connection between the MPTCP proxy and a PDN, the IP connection being configured for carrying data from both the first PDN connection and the second PDN connection; and establish a fourth IP-CAN session with a Policy and Charging Rules Function (PCRF) in the PCC system.

16. The network element of claim 15, wherein the network element is co-located with the MPTCP proxy.

17. The network element of claim 15, wherein the network element is co-located with any of the first, second and third PCEF:s.

18. The network element of claim 15, wherein the network element is co-located with the PCRF.

19. A PDN gateway comprising the network element of claim 15.

20. A computer program product comprising a non-transitory computer readable medium comprising computer-executable components for causing a network element to perform the method of claim 1 when the computer-executable components are run on processor circuitry in the network element.

21. A computer program product comprising a non-transitory computer readable medium comprising computer program code which is able to, when run on processor circuitry of a network element in a PCC system, cause the network element to:

establish a first Internet Protocol, IP, Connectivity Access Network, CAN, session with a first Policy and Charging Enforcement Function (PCEF) in the PCC system, the first PCEF being associated with a first Public Data Network (PDN) connection between a Multi-Path Transmission Control Protocol (MPTCP) capable radio device and an MPTCP proxy;

establish a second IP-CAN session with a second PCEF in the PCC system, the second PCEF being associated with a second PDN connection between the radio device and the MPTCP proxy;

establish a third IP-CAN session with a third PCEF in the PCC system, the third PCEF being associated with an IP connection between the MPTCP proxy and a PDN, the IP connection being configured for carrying data from both the first PDN connection and the second PDN connection; and establish a fourth IP-CAN session with a Policy and Charging Rules Function (PCRF) in the PCC system.

22. A Policy Control and Charging (PCC) system for a communication network, the PCC system comprising:

a network element comprising processor circuitry and a storage unit storing instructions executable by said processor circuitry;

a first Policy and Charging Enforcement Function (PCEF);

a second PCEF;

a third PCEF; and a Policy and Charging Rules Function (PCRF), wherein the network element is configured to:

establish a first Internet Protocol Connectivity Access Network (IP-CAN) session with the first PCEF, the first PCEF being associated with a first Public Data Network (PDN) connection between a Multi-Path Transmission Control Protocol (MPTCP) capable radio device and an MPTCP proxy, establish a second IP-CAN session with the second PCEF, the second PCEF being associated with a second PDN connection between the radio device and the MPTCP proxy;

establish a third IP-CAN session with the third PCEF, the third PCEF being associated with an IP connection between the MPTCP proxy and a PDN, the IP connection being configured for carrying data from both the first PDN connection and the second PDN connection; and establish a fourth IP-CAN session with the PCRF.

* * * * *